Figure 1:
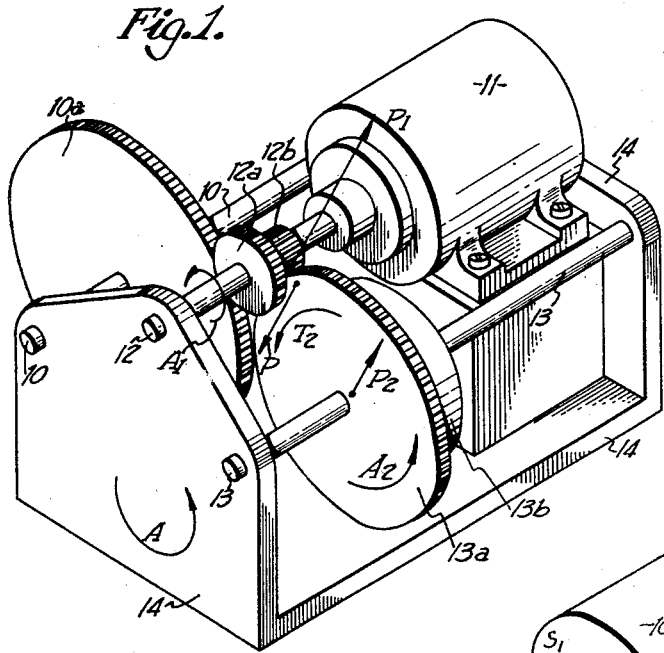

Nov. 10, 1959     J. D. BARR     2,911,833
SERVO-SYSTEMS

Filed Feb. 16, 1954     2 Sheets-Sheet 1

INVENTOR
JOHN DENZIL BARR
BY
    Herbert H. Thompson
    ATTORNEY

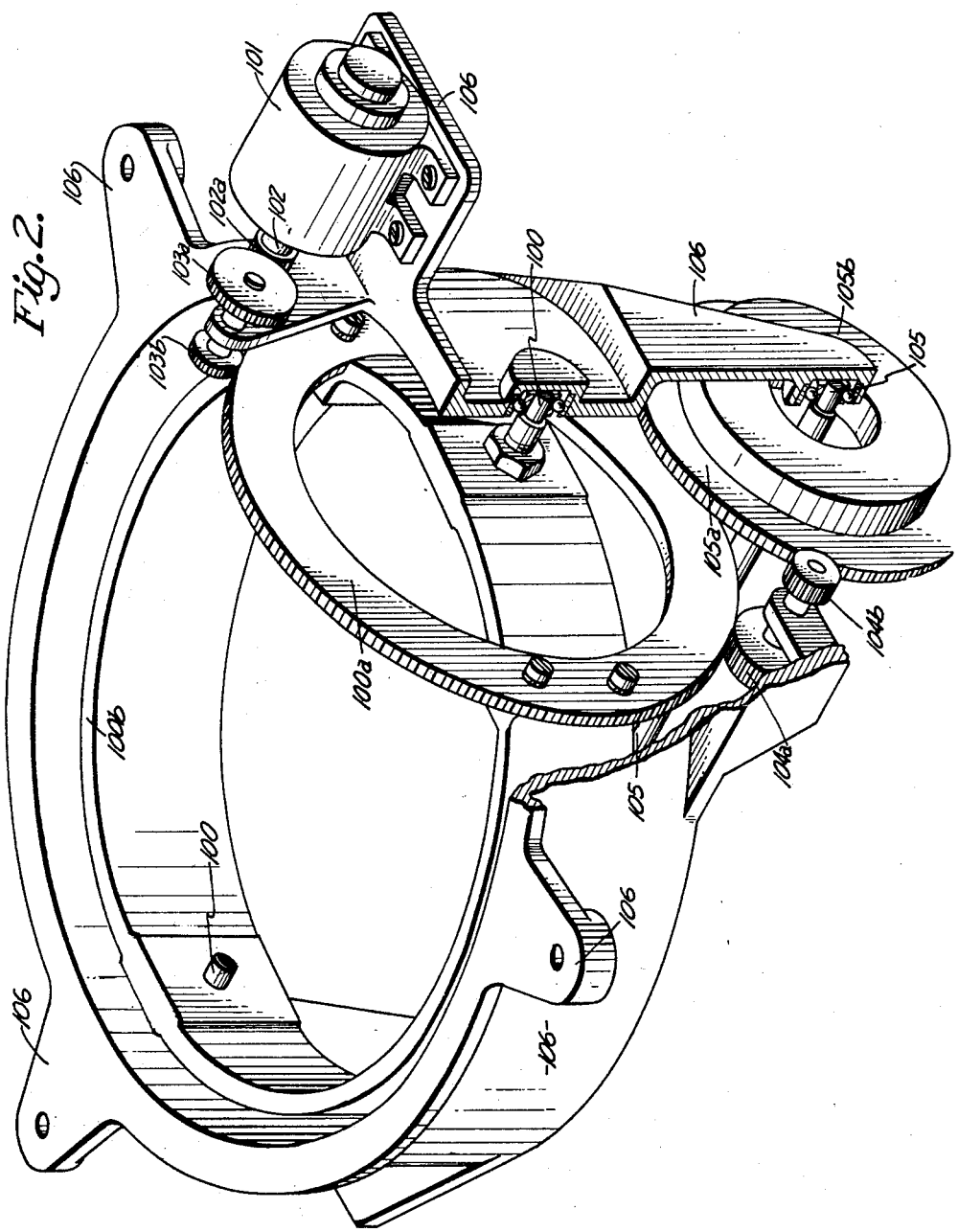

United States Patent Office 2,911,833
Patented Nov. 10, 1959

2,911,833
SERVO-SYSTEMS

John Denzil Barr, Warlingham, England, assignor to The Sperry Gyroscope Company Limited, Brentford, England, a British company Application February 16, 1954, Serial No. 410,610

Claims priority, application Great Britain
February 20, 1953

3 Claims. (Cl. 74—5.47)

This invention relates to a stabilising device for the stabilisation of a member to be stabilised such as for example a shaft mounted for rotation in a frame which is liable to experience angular acceleration about or having a component about the axis of the shaft. It is to be understood that the expression "a shaft" includes any object mounted for rotation about an axis. The object may, for instance, be a stable platform, a radio mirror or antenna, a gun or gun-sight or a gyroscopic element. Further the expression "stabilising a shaft" means herein preventing the angular accelerations of the frame of the device from affecting the member to be stabilised. Thus the member to be stabilised may be prevented from rotating about an axis with reference to an inertial co-ordinate system sometimes referred to as "a co-ordinate system of fixed orientation in space." Alternatively it may be prevented from rotating relative to earth axes or it may be controlled so that its angular position is determined by any extraneous conditions irrespective of movements of the said frame of the device.

When it is required to stabilise a device such as a shaft mounted in a frame by means of a motor, it is usual to interconnect the shaft to be stabilised and the motor driving shaft by means of gearing, so that, if the motor shaft rotates relative to the frame, the shaft to be stabilised rotates at a slower speed relative to the frame than the motor shaft. This enables the motor to be operated more efficiently than it could be if its shaft were connected directly to the reference shaft, since the velocities of rotation normally required for the reference shaft relative to the frame are low compared with the velocities at which the motor operates efficiently.

A difficulty that arises when the motor is connected to the reference shaft through gearing is that when the frame is given an absolute angular acceleration about, or having a component about, the axis of the reference shaft, it is necessary to impart to the shaft of the motor and its associated gears an absolute angular acceleration. Since the motor and gears have appreciable inertia, the motor has to supply whatever torque is necessary to impart the necessary accelerations. The torque that has to be applied to each shaft is determined by the product of the moment of inertia of that shaft and the absolute angular acceleration that is to be imparted to it. The acceleration to be imparted to the driving shaft of the motor for any given angular acceleration of the frame depends on the gear ratio between the driving shaft and the reference shaft, and consequently, if a high gear ratio is used, a large accelerating torque has to be supplied by the motor. Thus, in the past, it has been often found necessary to use a comparatively small gear ratio and an inefficient motor having a low inertia torque ratio rather than a higher ratio and a more efficient motor.

The present invention is based on the fact that it is possible to provide a system in which very little torque has to be provided by the motor when the frame is given angular acceleration. Thus in the ideal case the only torque that has to be provided by the motor is that necessary to overcome friction.

According to the present invention we provide a stabilising device having a frame in which a rotatable member to be stabilised is journalled, a motor, mounted on the said frame, capable of driving the member to be stabilised by way of gearing and an auxiliary shaft journalled in the frame and connected to the said member to be stabilised by way of gearing, such that rotation of the member to be stabilised, relative to the frame, causes the auxiliary shaft to rotate, relative to the frame, in the same direction as, and more slowly than, the means to be stabilised.

It is a further feature of the invention that we provide a stabilising device having a frame in which a rotatable member to be stabilised is journalled, a motor, mounted on the said frame, capable of driving the member to be stabilised by way of gearing and an auxiliary shaft journalled in the frame and connected to the said member to be stabilised by way of gearing, such that rotation of the member to be stabilised, relative to the frame, causes the auxiliary shaft to rotate relative to the frame, in the same direction as, and more slowly than, the means to be stabilised wherein when the frame is subjected to angular accelerations a torque is produced, by the inertia of the auxiliary shaft and its attendant parts, on the member to be stabilised, of a magnitude and direction equal to the torque required to produce the angular acceleration of the rotatable parts of the motor. It is to be understood that where the term gearing is used the connection need not necessarily be in the form of meshing toothed gearing but may be in the form of a belt, chain, or friction drive.

The operation of the invention may be considered academically in the following way: a frame has a number of shafts mounted for rotation in it, a shaft to be stabilised being designated by $S_0$, a first shaft geared to the shaft to be stabilised by $S_1$, and an $n$th shaft by $S_n$. The gear ratio between shaft $S_1$ and the shaft $S_0$ to be stabilised is $G_1$ and the gear ratio between the shaft $S_n$ and the shaft $S_0$ to be stabilised is $G_n$, that is to say, the angular velocity or acceleration of shaft $S_n$ relative to the frame is $G_n$ multiplied by the angular velocity or acceleration of the shaft $S_0$ to be stabilised relative to the frame. $G_n$ will be positive if shaft $S_n$ rotates in the same direction relative to the frame as the shaft $S_0$ to be stabilised and negative if it rotates in the opposite direction, relative to the frame, to the shaft $S_0$ to be stabilised. If the frame is given an absolute angular acceleration $A$, the shaft $S_0$ to be stabilised must have a relative angular acceleration with reference to the frame of $-A$, if it is not to have an absolute angular acceleration. In this case shaft $S_n$ must have an angular acceleration relative to the frame of $-G_nA$ and thus the absolute angular acceleration of shaft $S_n$ must be $(1-G_n)A$. If the moment of inertia of shaft $S_n$ is $I_n$, the torque required on shaft $S_n$ is $I_n(1-G_n)A$. In prior systems the torque for each shaft has been provided by the motor and, if the torque required by each shaft is referred to the motor shaft, the total torque to be supplied by the motor can be calculated. In the present system it is intended that the motor should not provide any torque—except for overcoming friction which is ignored in this analysis, or for causing a desired angular acceleration of the reference shaft, assumed zero in this analysis—and hence it is more convenient to refer all the torques to the shaft to be stabilised, i.e. to consider that the torque required on shaft $S_n$ is supplied by the shaft $S_0$ to be stabilised. The torque that would have to be supplied by the shaft $S_0$ to be stabilised to exert a torque $I_n(1-G_n)A$ on shaft $S_n$ is $G_nI_n(1-G_n)A$. However if the shaft $S_0$ to be stabilised is to remain unaccelerated, it must not be required to exert any torque and consequently the sum of all the torques it is required to exert must be zero, i.e. the necessary conditions are fufilled if $$\Sigma G_n(1-G_n)1_n A=0 \qquad (1)$$

or $$\Sigma G_n(1-G_n)I_n=0 \qquad (2)$$

For some shafts $G_n(1-G_n)$ will be positive and for others it will be negative, so that it is possible by suitable choice of values for the gear ratios and moments of inertia to equate the left-hand side of Equation 2 to zero. In general is will be found that for most shafts $G_n(1-G_n)$ will be negative and such shafts may be regarded as unstabilising shafts. It may be seen that these shafts are all those for which $G_n$ is negative or is positive and greater than unity. Thus it is only those shafts for which $G_n$ is both positive and less than unity that exert a stabilising influence on the reference shaft and it is necessary to make the moments of inertia of such shaft sufficiently high to make the left-hand side of Equation 2 equal to zero. The conditions necessary for complete stabilisation of the reference shaft in any particular arrangement of shafts may be obtained from Equation 2.

The invention will be more readily appreciated from the following description reference being had to the several figures of the accompanying drawings.

Figure 2A:
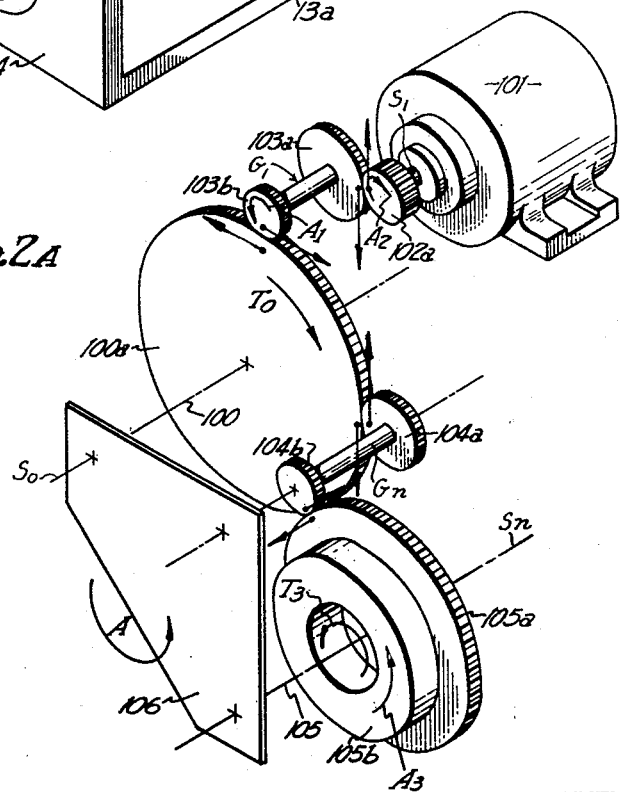

Figure 1 shows one embodiment of the invention comprising three shafts mounted in a frame, Figure 2 shows a preferred embodiment comprising four shafts mounted in a frame and Figure 2a is a schematic view of the gear train shown in Figure 2.

Referring now specifically to Fig. 1 a shaft 10 to be stabilised carries a gear 10a and a platform 10b (shown here) as, but not restricted to, a gimbal ring to be maintained horizontal. A motor 11 has a shaft 12 which carries a double gear pinion 12a, 12b which meshes with the gear 10a and a gear 13a respectively. The gear 13a is secured to a flywheel 13b mounted upon a shaft 13. The motor 11 is mounted on, and the shafts 10, 12 and 13 are all journalled in, the frame member 14. In normal operation an error detecting device will provide an electrical signal which will control the motor 11 for stabilisation of the shaft 10.

If, however, the frame 14 is angularly accelerated, then the motor 11 may receive a large signal and be required to provide a torque greater than that required to overcome friction. The system of Fig. 1 at present under discussion removes the above noted objection provided that Equation 2 is satisfied.

In the system of Fig. 1 Equation 2 may be written as follows:

$$G_1I_1(1-G_1)+G_2I_2(1-G_2)=0$$

where $G_1$ is the gear ratio between shaft 10 and shaft 12 (as defined)

$I_1$ is the inertia of shaft 12, pinion 12a, 12b and the motor armature (not shown)

$G_2$ is the gear ratio between shaft 10, and shaft 13 (as defined)

$I_2$ is the inertia of shaft 13, flywheel 13b and gear 13a.

On rewriting the equation we have $$G_2I_2(1-G_2)=G_1I_1(G_1-1) \qquad (3)$$

Now if the values of $G_1$ and $I_1$ are fixed then it is necessary to choose values of $G_2$ and $I_2$ to satisfy Equation 3.

To take a particular example, $I_1$ the inertia of the armature (not shown) of the motor 11 and its pinion 12a, 12b is 50 gm. cm.² and $G_1$, the gear ratio between the gear 12a and the gimbal system or platform (not shown) secured to gear 10a, is −10, the negative sign indicating that clockwise or anticlockwise rotation of the reference shaft 10 relative to the frame 14 produces the opposite rotation of the motor shaft 12 relative to the frame 14. Substituting these values in the right-hand side of the Equation 3 above it will be seen that $G_2I_2(1-G_2)$ must be made equal to 5,500 gm. cm.². If the flywheel 13b secured to the gear 13a is to be as small as possible consistent with Equation 3 then the value of $G_2$ must be made +½ which makes $G_2(1-G_2)$ equal to its maximum possible value of +¼. Then $L_2$ must be 22,000 gm. cm.² which could be obtained by making the radius of gyration of the flywheel 13b, gear 13a and shaft 13 equal to 10 cm. and their weight equal to 220 gm.

If a larger flywheel is used, there will be a choice of two values of $G_2$, since Equation 3 is a quadratic in $G_2$. In general is has been found that, if the reference shaft 10 is to be prevented from accelerating about its axis, relative to fixed axes it will be convenient to use the higher value for $G_2$. If however, the shaft 10 is to be controlled to accelerate about its axis, it is desirable to make the gear ratio between the auxiliary stabilising shaft 13 and the reference shaft 10 as low as possible, that is to say, the fraction having the lowest numerical value should be used. Thus in the present case $G_2$ could be made to equal ⅓ or ⅔ if $I_2$ were increased to 22,750 gm. cm.².

If the frame 14 is given an angular acceleration A, and the reference shaft 10 is required not to accelerate about its axis, then the shaft 12 and pinions 12a and 12b and the armature of the motor 11 must be given an angular acceleration $A_1$ in the same direction as A, equal to $(1-G_1)A$. In the absence of the auxiliary shaft 13, this angular acceleration would be provided by a torque from the motor windings called up by an error detecting device on shaft 10, preventing appreciable or sustained error of the angular position of the shaft to be stabilised 10. But owing to the appropriate choice of gear ratios, the auxiliary shaft 13 and its flywheel 13b and gear 13a have an angular acceleration $A_2$ in the same direction as A, equal to $(1-G_2)A$. This must be produced by a torque $T_2$ consisting of equal and opposite forces $P_2$ on the axis and P on the pitch line of the gear 13a. The reaction $P_1$ to P on the pinion 12b acting about the axis of shaft 12 provides the torque necessary to provide the angular acceleration $A_1$, thus relieving the motor windings and control system of the load.

Referring now specifically to Fig. 2 a shaft to be stabilised 100 carries a gear 100a and a gimbal ring 100b to be maintained horizontal.

A motor 101 has a shaft 102 which carries a pinion 102a meshing with a double pinion 103a, 103b which in turn meshes with the gear 100a attached to the gimbal ring 100b. A double pinion 104a, 104b meshes with the gear 100a and a gear 105a respectively. The gear 105a is secured to a flywheel 105b carried by an auxiliary shaft 105. The shafts 100, 105; and double pinions 103a, 103b, 104a, 104b are all journalled in the frame 106. Motor 101 is secured to a flange mounting 107 which is an integral part of the frame 106.

For ease of illustration the gear train of Fig. 2 is shown in Fig. 2a. The same reference numerals being employed to denote the same integers.

Consider, now, Figs. 2, 2a and the tabular angular accelerations below

| Body | Reference Shaft 100 | Frame 106 | Auxiliary Shaft 105 |
| --- | --- | --- | --- |
| | 1 | 0 | ½ |
| add −1 | 0 stabilised | −1 | −½ |
| change signs | 0 | 1 | ½ |

If the frame 106 rotates relative to the shaft to be stabilised 100, then the auxiliary shaft 105 rotates in the same direction as the shaft 100 but more slowly than the frame. The fraction ½ as used in the table, is derived from an assumed 2:1 reduction between the shaft 100 and the shaft 105 owing to double pinion 104a, 104b; gear 104a having twice the diameter of gear 104b.

If the frame 106 is given an angular acceleration A, and the shaft 100 is required not to accelerate about its axis, then the shaft 103, pinions 103a and 103b, 102a, and the armature of the motor 101 must be given appropriate angular accelerations $A_1$, $A_2$ in the same and opposite directions to A respectively. In the absence of the auxiliary shaft 105 and its gearing 104a, 105a, these angular accelerations would be provided by a torque from the motor windings called up by an error detecting device on shaft 100, preventing appreciable or sustained error of the angular position of shaft 100.

But because of the appropriate choice of gear ratios, the auxiliary shaft 105 and its flywheel 105b and gear 105a have an angular acceleration $A_3$ equal, here, to ½A in the same direction as A. This must be caused by a torque $T_3$ transmitted from the reference shaft 100 by the gearing 100a 104a, 104b, 105a, and causing a torque reaction on the shaft to be stabilised 100 of $T_0$ in the opposite sense to A. If Equation 2 is satisfied this torque $T_0$ has the correct value to provide the angular acceleration of the shaft 103, pinions 103a, 103b, 102a and via the said shaft and pinions the armature of the motor. The motor windings are thus relieved of all but friction torques.

Since many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

What I claim is:

1. In a stabilized apparatus, a frame, a stabilized member pivotally mounted in said frame for rotation about an axis, a motor mounted in said frame and adapted to drive said member upon energization thereof, an inertial mass carried by said frame, and first and second gear trains respectively interconnecting said member and said motor armature and said member and said inertial mass, the gear ratio of said first gear train being such as to provide a speed drop from said motor to said member and the gear ratio of said second gear train being such as to provide a speed drop from said member to said inertial mass whereby upon relative angular acceleration of said frame and member the torque produced from said member to said motor which opposes the initial restoration torque developed by said motor when energized is reduced by said inertial mass.

2. A stabilizing device of the character set forth in claim 1 wherein said inertial mass comprises a flywheel journalled for rotation about an axis in said frame.

3. Apparatus of the character set forth in claim 1 wherein said second gear train ratio and the inertia of said mass are so selected that the torque produced by said member on said motor has a value determined by the relation $\Sigma G_n(1-G_n)I_n=0$, wherein $G_n$ is the gear ratio of said second gear train and $I_n$ is the inertia of said inertial mass.

References Cited in the file of this patent

UNITED STATES PATENTS

| | | |
|---|---|---|
| 2,025,640 | Broulhiet | Dec. 24, 1935 |
| 2,383,409 | Newell | Aug. 21, 1945 |
| 2,446,096 | Moore | July 27, 1948 |

FOREIGN PATENTS

| | | |
|---|---|---|
| 578,489 | Great Britain | July 1, 1946 |